United States Patent
Bufe et al.

(10) Patent No.: US 10,713,438 B2
(45) Date of Patent: **\*Jul. 14, 2020**

(54) DETERMINING OFF-TOPIC QUESTIONS IN A QUESTION ANSWERING SYSTEM USING PROBABILISTIC LANGUAGE MODELS

(71) Applicant: International Business Machines Corporation, Armonk, NY (US)

(72) Inventors: John P. Bufe, Washington, DC (US); Srinivasa Phani K. Gadde, Sommerville, MA (US); Julius Goth, III, Franklinton, NC (US)

(73) Assignee: International Business Machines Corporation, Armonk, NY (US)

( * ) Notice: Subject to any disclaimer, the term of this patent is extended or adjusted under 35 U.S.C. 154(b) by 999 days.

This patent is subject to a terminal disclaimer.

(21) Appl. No.: 15/182,818

(22) Filed: Jun. 15, 2016

(65) Prior Publication Data
US 2016/0300154 A1    Oct. 13, 2016

Related U.S. Application Data

(63) Continuation of application No. 14/665,967, filed on Mar. 23, 2015, now Pat. No. 10,372,819.

(51) Int. Cl.
*G06F 17/00*    (2019.01)
*G06F 17/20*    (2006.01)
(Continued)

(52) U.S. Cl.
CPC .......... *G06F 40/284* (2020.01); *G06F 40/289* (2020.01); *G06F 40/295* (2020.01); *G06F 40/30* (2020.01); *G06N 5/045* (2013.01)

(58) Field of Classification Search
CPC .. G06F 17/277; G06F 17/2775; G06F 17/278; G06F 17/2785; G06N 7/005
See application file for complete search history.

(56) References Cited

U.S. PATENT DOCUMENTS 7,809,570 B2 * 10/2010 Kennewick ............. G10L 15/22
                                                       704/257
9,336,269 B1    5/2016 Smith et al.
(Continued)

OTHER PUBLICATIONS

Ma, X., et al. "Combining Naive Bayes and Tri-gram Language Model for Spam Filtering". Y. Wang and T. Li (Eds.): Knowledge Engineering and Management AISC 123 pp. 509-520.springer.com. Copyright Springer-Verlag Berlin, Heidelberg 2011.
(Continued)

*Primary Examiner* — Luis A Sitiriche
(74) *Attorney, Agent, or Firm* — William H. Hartwell

(57) ABSTRACT

A question answering system that determines whether a question is off-topic by performing the following steps: (i) receiving, by a question answering system, a set of documents; (ii) identifying topical subset(s) for each document of the set of documents using named entity recognition, where each topical subset relates to a corresponding topic; (iii) assigning a set of topic score(s) for each topical subset using natural language processing, where each topic score relates to a corresponding probability associated with the respective topical subset under a probabilistic language model; and (iv) determining, based, at least in part, on the topic score(s) corresponding to the topical subset(s), whether a question input into the question answering system is off-topic.

18 Claims, 6 Drawing Sheets

(51) Int. Cl.
*G06F 40/284* (2020.01)
*G06N 5/04* (2006.01)
*G06F 40/30* (2020.01)
*G06F 40/289* (2020.01)
*G06F 40/295* (2020.01)

(56) References Cited

U.S. PATENT DOCUMENTS

| | | |
|---|---|---|
| 2004/0236725 A1 | 11/2004 | Amitay et al. |
| 2012/0323948 A1* | 12/2012 | Li .................... G06F 16/3323 707/765 |
| 2013/0035931 A1 | 2/2013 | Ferrucci et al. |
| 2013/0304749 A1 | 11/2013 | Cooper |
| 2014/0164303 A1 | 6/2014 | Bagchi et al. |
| 2015/0154305 A1 | 6/2015 | Lightner et al. |

OTHER PUBLICATIONS

Peng, F., et al. "Combining Naive Bayes and n-Gram Language Models for Text Classification". F. Sebastiani (Ed.): ECIR 2003, LNCS 2633, pp. 335-350, 2003. Springer-Verlag Berlin Heidelberg 2003.

Yilmazel, O., et al. "Leveraging One-Class SVM and Semantic Analysis to Detect Anomalous Content". P. Kantor et al. (Eds.): ISI 2005, LNCS 3495, pp. 381-388, 2005. © Springer-Verlag Berlin Heidelberg 2005.

Appendix P List of IBM Patents or Applications Treated as Related. Two pages. Dated Jun. 27, 2016.

Original U.S. Appl. No. 14/665,967, filed Mar. 23, 2015.

* cited by examiner

DETERMINING OFF-TOPIC QUESTIONS IN A QUESTION ANSWERING SYSTEM USING PROBABILISTIC LANGUAGE MODELS

BACKGROUND

The present invention relates generally to the field of question answering systems, and more particularly to evaluating questions asked of question answering systems.

Question answering (QA) is a known computer science discipline within the fields of information retrieval and natural language processing (NLP). Generally speaking, QA systems automatically answer questions posed by humans in natural language, typically by either querying a structured database of knowledge/information or by retrieving answers from unstructured collections of natural language documents. QA systems are commonly designed to answer questions about a specific set of topics (also referred to as a "domain"), where a question pertaining to the QA system's domain is considered "on-topic," and a question that does not pertain to the QA system's domain is considered "off-topic."

Named entity recognition (NER) is known. NER typically involves detecting and classifying in-text elements into pre-defined categories, such as names, dates, locations, and quantities, for example.

SUMMARY

According to an aspect of the present invention, there is a method, computer program product and/or system that performs the following steps (not necessarily in the following order): (i) receiving, by a question answering system, a set of documents; (ii) identifying topical subset(s) for each document of the set of documents using named entity recognition, where each topical subset relates to a corresponding topic; (iii) assigning a set of topic score(s) for each topical subset using natural language processing, where each topic score relates to a corresponding probability associated with the respective topical subset under a probabilistic language model; and (iv) determining, based, at least in part, on the topic score(s) corresponding to the topical subset(s), whether a question input into the question answering system is off-topic.

DETAILED DESCRIPTION

Figure 1:
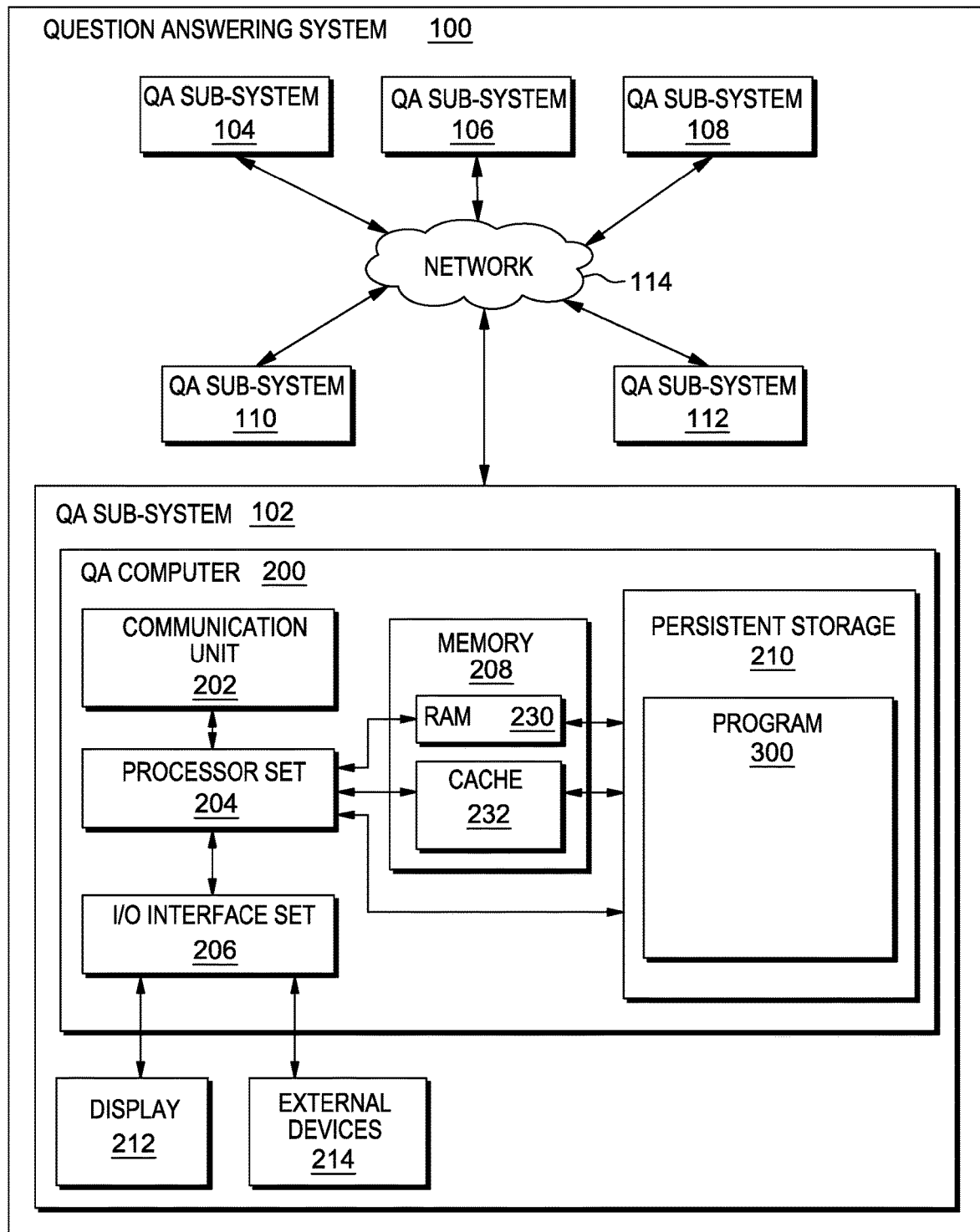
FIG. 1 is a block diagram view of a first embodiment of a system according to the present invention.

Question Answering (QA) systems are generally designed to answer questions about specific sets of topics, and tend to have difficulty answering questions not relating to those topics (or, "off-topic" questions). Embodiments of the present invention determine whether a question is off-topic by using Named Entity Recognition (NER) and natural language processing to provide topic scores based on training corpora and probabilistic language models. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of question answering (QA) system 100, including: QA sub-system 102; QA sub-systems 104, 106, 108, 110, 112; communication network 114; QA computer 200; communication unit 202; processor set 204; input/output (I/O) interface set 206; memory device 208; persistent storage device 210; display device 212; external device set 214; random access memory (RAM) devices 230; cache memory device 232; and program 300.

QA sub-system 102 is, in many respects, representative of the various computer sub-system(s) in the present invention (including, for example, QA sub-systems 104, 106, 108, 110, and 112). Accordingly, several portions of sub-system 102 will now be discussed in the following paragraphs.

QA sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

QA sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of QA sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for QA sub-system 102; and/or (ii) devices external to sub-system 102 may be able to provide memory for QA sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to QA sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with QA computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment in accordance with the present invention. However, it should be appreciated that any particular program nomenclature herein is used merely for convenience, and thus the invention should not be limited to use solely in any specific application identified and/or implied by such nomenclature.

The descriptions of the various embodiments in accordance with the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
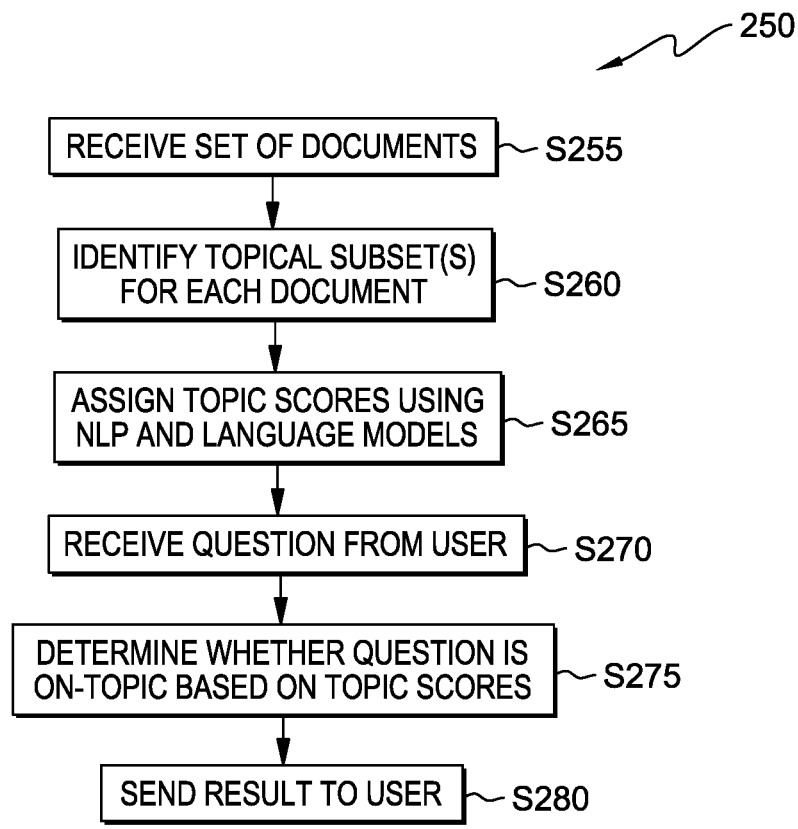
FIG. 2 is a flowchart showing a first embodiment method performed, at least in part, by the first embodiment system.
Figure 3:
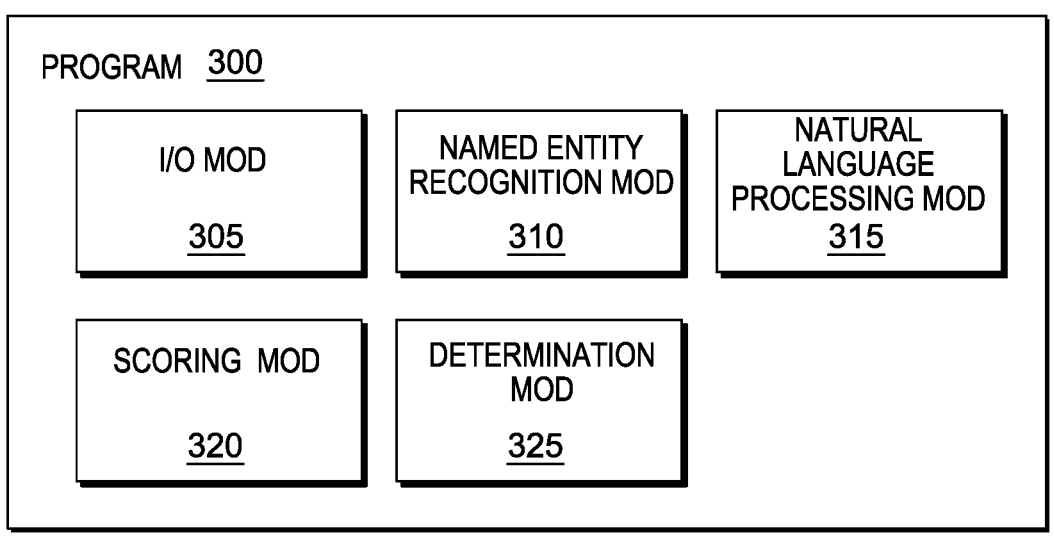
FIG. 3 is a block diagram showing a machine logic (for example, software) portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

The discussion of method 250 and program 300 over the following paragraphs will sometimes refer to a common example (referred to as the "present example"). In the present example, question answering (QA) system 100 is adapted to answer questions about television (or "TV") shows. It should be noted that this present example is provided for explanatory purposes, and that typical examples and/or embodiments in accordance with the present invention may include substantially more detail and be adapted to answer a wide range of potential question topics.

Processing begins at step S255, where I/O module ("mod") 305 receives a set of document(s). Generally speaking, the received documents (sometimes also referred to as "training corpora") include textual content to be used for the purpose of training question answering (QA) system 100 (including QA sub-systems 102, 104, 106, 108, 110, and 112) how to better detect whether a given question is off-topic. The documents may include a wide variety of known (or yet to be known) document types and/or formats. In the present example, the received documents include digital copies of two textbooks (titled "The History of Television" and "Exploring Outer Space"), and are provided in the form of basic text files. Some other examples of document types include, but are not limited to: (i) scholarly articles; (ii) miscellaneous data obtained via a web search; and/or (iii) example questions, such as questions that are likely (or not likely) to be asked of QA system 100. Some additional examples of document formats include, but are not limited to: (i) word-processor compatible digital files; (ii) unstructured data from a wide variety of digital filetypes; (iii) physical (for example, paper) documents that have been converted to a machine-readable format; and/or (iv) spoken word audio that has been converted to a machine-readable format.

It should be noted that the receiving of documents by QA system 100 in step S255 is not the same as receiving questions to be answered by QA system 100 (which will occur later in the processing of method 250). That is, in this step, QA system 100 is in a training mode wherein it is receiving input (that is, documents) for the purpose of improving its ability to detect off-topic questions. While some of the received documents may, in fact, be questions, they are not questions that will be directly answered by QA system 100, at least not during steps S255, S260, and S265.

Processing proceeds to step S260, where named entity recognition (NER) mod 310 (see FIG. 3) identifies topical subset(s) for each document of the set of documents using named entity recognition, where each topical subset relates to a corresponding topic. Or, stated another way, in this step, NER mod 310 organizes each document into subsets based on topic. In some embodiments, the identification/organization takes place in the form of annotations to the original document (or a copy). For additional discussion of annotations that may be made to the documents, see the Further Comments and Embodiments sub-section of this Detailed Description.

In some embodiments (such as embodiments discussed below in the Further Comments and/or Embodiments sub-section of this Detailed Description), the topical subsets are each about the size of a paragraph (approximately 1-4 sentences). However, this is not meant to be limiting, and the topical subsets may be any of a wide variety of lengths. For example, in some embodiments, the topical subsets are all 500 words long. In other embodiments, the topical subsets are limited to single sentences. In still other embodiments, the topical subsets include a range of lengths, each depending on the importance of the particular topic and/or its relevance in the set of documents.

In the present example (the example being discussed throughout this sub-section), the topical subsets correspond to chapters in each of the two received textbooks. Specifically, the chapter titles and their correspondingly identified topics for the first textbook, "The History of Television," are as follows: (i) "The Network Era," (topic: pre-1980's television); (ii) "The Post-Network Era," (topic: television from the 1980's to present); and (iii) "TV/Film Crossovers," (topic: television show characters depicted in film). Furthermore, the chapter titles and their correspondingly identified topics for the second textbook, "Exploring Outer Space," are as follows: (i) "The Apollo Missions" (topic: manned spaceflight, Apollo); (ii) "The Space Shuttle," (topic: manned spaceflight, space shuttle); and (iii) "Depictions in TV and Film," (topic: television and film depicting outer space).

Processing proceeds to step S265, where natural language processing (NLP) mod 315 (see FIG. 3) and scoring mod 320 assign a set of topic score(s) for each topical subset using NLP, where each topic score relates to a corresponding probability associated with the respective topical subset under a probabilistic language model (or "language model"). Stated another way, in this step, each topical subset is assigned a set of topic scores relating to how likely it is that the subset is off-topic (or on-topic) for the domain of QA system 100. A topic score is typically obtained by using NLP to associate words in a topical subset with a language model trained for QA system 100.

Generally speaking, a probabilistic language model is a model that assigns a probability to a sequence of words. More specifically, in embodiments of the present invention, language models assign a probability that a sequence of words (obtained via NLP and NLP mod 315) from a given topical subset are likely to appear within the domain of QA system 100. Language models may be generated in a wide variety of ways (include via methods discussed below in the Further Comments and/or Embodiments sub-section of this detailed description) and may be adapted to model a wide variety of QA system domains (or topics). In the present example, the language model (also referred to as the "television show language model") provides a probability that a topical subset pertains to the domain of television shows.

As stated above, topic scores (generated by scoring mod 320) are related to probabilities associated with topical subsets under specific language models. As such, many topic scores take the form of a percentage (or, more simply, a corresponding number between 0 and 100). Additionally, in many embodiments (including the present example), the topic score resembles an inverse of the associated probability under a language model, in order to better demonstrate the probability that the topical subset is off-topic (as opposed to on-topic). However, this is not meant to be limiting, and topic scores may be represented in a wide variety of known (or yet to be known) ways. Some examples of topic score representations include, but are not limited to: (i) scores where the "strongest" scores are the closest to zero; (ii) scores ranging from 0 to 1; (iii) letters of the alphabet; (iv) alphanumeric words; and/or (v) binary scores. Furthermore, in many embodiments, a topical subset may be assigned multiple topic scores, with each topic score being associated with a separate probabilistic language model. For example, in some embodiments, each topical subset is assigned an on-topic score and an off-topic score. The on-topic score relates to a probability associated with the topical subset under an on-topic language model (that is, the probability that the topical subset is on-topic), and the off-topic score relates to a probability associated with the topical subset under an off-topic language model (that is, the probability that the topical subset is off-topic). For a further discussion of the use of multiple language models to generate on-topic scores and off-topic scores, see the Further Comments and/or Embodiments sub-section of this Detailed Description.

Still referring to step S265, in the present example, the assigned topic scores according to the television show language model (with their associated topics) are as follows: (i) pre-1980's television: 5; (ii) television from the 1980's to present: 2; (iii) television show characters depicted in film: 24; (iv) manned spaceflight, Apollo: 88; (v) manned spaceflight, space shuttle: 86; and (vi) television and film depicting outer space: 33. As demonstrated by the assigned topic scores, the higher the topic score, the more likely the topic does not pertain to television shows (and is therefore off-topic for QA system 100). Conversely, the more likely the topic pertains to television shows, the lower the topic score.

Processing proceeds to step S270, where I/O mod 305 (see FIG. 3) receives a question from a user. As opposed to step S255 (discussed above), in this step, QA system 100 receives as input an actual question being asked of QA system 100 instead of content designed to train QA system 100. The question may be received from the user in any of a wide variety of ways, including, for example, via keyboard entry and/or via a microphone. In the present example, the user asks the following question via a microphone: "how many space shuttle missions were there?"

Processing proceeds to step S275, where determination mod 325 (see FIG. 3) determines whether the question is off-topic based, at least in part, on the topic score(s) corresponding to the topical subset(s). In many embodiments, this determination is made by performing NER (such as in step S260) on the question and comparing the resulting identified topic(s) to the topic score(s) pertaining to similar topics (determined in step S265). For example, in the present example, determination mod 325 sends the received question to NER mod 310, and receives a corresponding result from NER mod 310 indicating that the question's topic is "manned spaceflight, space shuttle." Because scoring mod 320 had already scored a topical subset with the same topic ("manned spaceflight, space shuttle") with an 86 (which indicates a high probability of being off-topic), determination mod 325 determines that the question is off-topic. It should be again noted that this example is meant to demonstrate the features of the present invention with relative simplicity. In most embodiments, there will be many more topics, topical subsets, and topic scores to help in determining whether the question is off-topic.

In some embodiments of the present invention, the determination in step S275 involves assigning the received question with its own topic score. For example, referring to the present example, the question ("How many space shuttle missions were there?") could be assigned a topic score of 86, given the previously assigned topic score associated with the topic of "manned spaceflight, space shuttle." In other embodiments (such as embodiments discussed below in the Further Comments and/or Embodiments sub-section of this Detailed Description), the topic score is calculated in alternate ways. For example, in one embodiment, the topic score for the question is determined, at least in part, by using a sigmoid function to model the difference between a logarithm probability (or a "logarithmic probability distribution") associated with the question under an on-topic probabilistic language model and a logarithm probability associated with the question under an off-topic probabilistic language model.

Referring still to embodiments where the question received in step S270 has been assigned its own topic score, in some embodiments, step S275 further includes comparing the question's assigned topic score to a relevance score associated with an answer generated by the question answering system in response to the question. Or, stated another way, in these embodiments, QA system 100 will actually generate an answer to the question, in addition to determining whether the question is off-topic. Then, QA system 100 will assign a relevance score to the generated answer and compare it to the topic score for the question. In some embodiments, if the question's assigned topic score is greater than the answer's relevance score, the question is determined to be off-topic. Similarly, in these embodiments, if the answer's relevance score is greater than the question's topic score, the question is determined to be on-topic. For further discussion of embodiments where question topic scores are compared to answer relevance scores (where the scores are normalized into "confidence values"), see the Further Comments and/or Embodiments sub-section of this Detailed Description.

Figure 4:
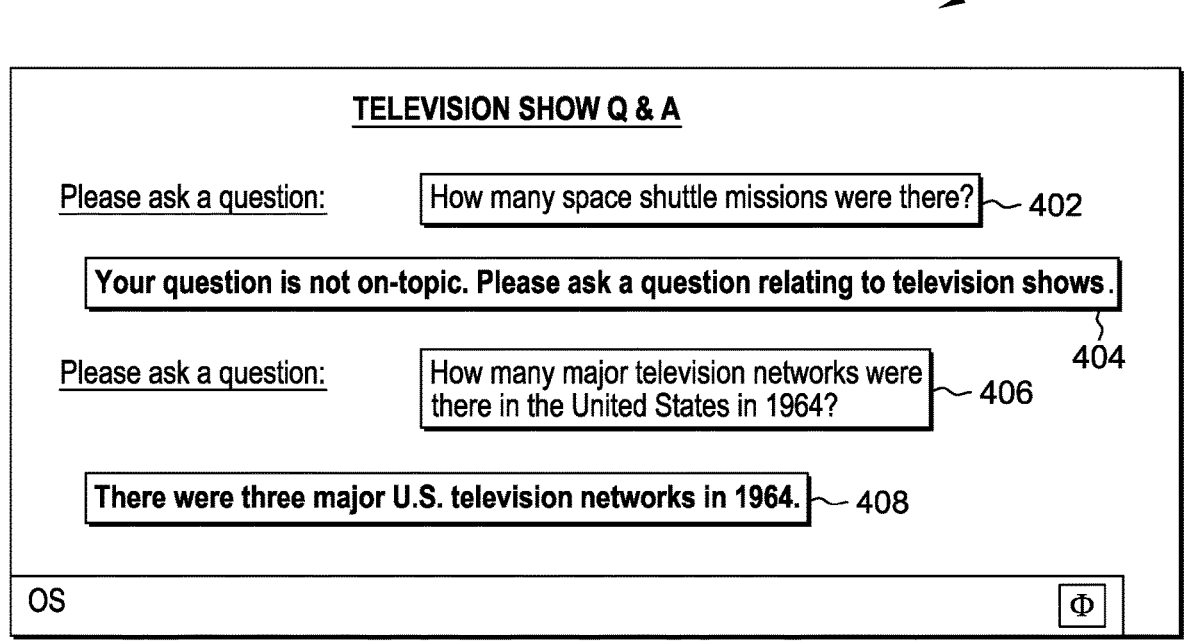
FIG. 4 is a screenshot view generated by the first embodiment system.

Processing proceeds to step S280, where I/O mod 305 sends the result of the determination in step S275 to the user. Stated another way, in this step, the user is informed whether the question input into the question answering system is off-topic. Screenshot 400 (see FIG. 4) depicts an interaction between QA system 100 and the user according to the present example. As shown in FIG. 4, in this example, the user types the question, "How many space shuttle missions were there?" into question box 402. In response, QA system 100 (via I/O mod 305) displays response 404 on the computer screen, indicating that the question is off-topic. FIG. 4 also shows a second question asked by the user: "How many major television networks were there in the United States in 1964?" via question box 406. In this case, as processing proceeds from step S270 through step S275, determination mod 325 determines that the question is not off-topic. As a result, instead of directly informing the user that the question is on-topic, I/O mod 305 simply answers the question via response 408.

III. Further Comments and/or Embodiments

Some embodiments of the present invention recognize the following facts, potential problems and/or potential areas for improvement with respect to the current state of the art: (i) existing QA systems attempt to interpret off-topic input as if it was on-topic; (ii) existing QA systems that include lists for matching specific off-topic patterns are not comprehensive and require regular maintenance to keep up-to-date; (iii) existing systems provide too many false positive results (that is, on-topic questions that are incorrectly classified as off-topic), which can be very costly and may frustrate a user intent on receiving a relevant answer; (iv) existing lexical answer type-based methods do not address whether a question is off-topic given the domain of a QA system.

Some embodiments of the present invention may include one, or more, of the following features, characteristics and/or advantages: (i) identifying off-topic questions that are unrelated to a QA system's problem domain; (ii) re-focusing users and influencing them to ask more meaningful questions; (iii) limiting false positives while successfully detecting as many off-topic questions as possible; and/or (iv) integrating search and linguistic features derived from deep semantic knowledge of question text into the answerer logic of a QA pipeline.

Embodiments in accordance with the present invention build a classifier that analyzes an input and determines whether it is on-topic or off-topic for a given system. In these embodiments, the classifier typically only needs to be trained once for a system, after which point the classifier will be able to determine on-topic and off-topic questions from a broad range of inputs with high confidence.

Figure 5:
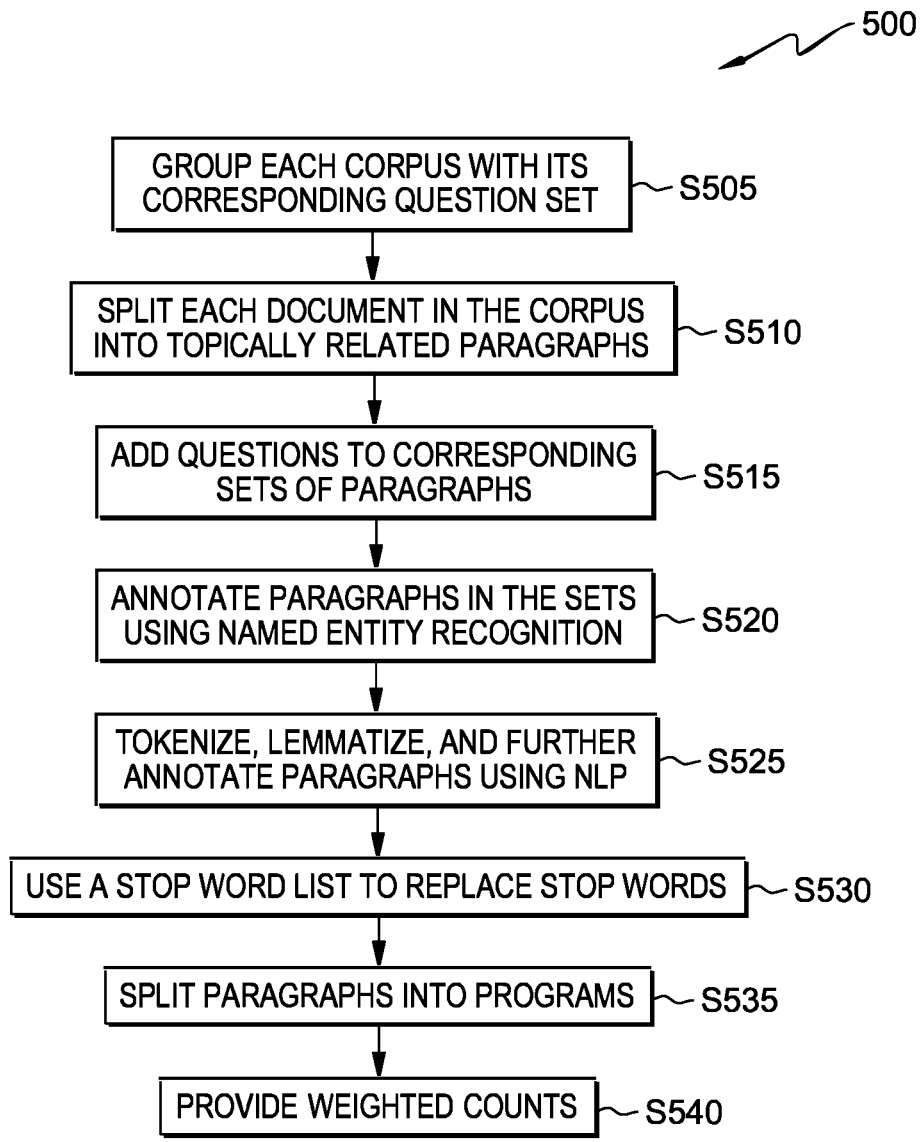
FIG. 5 is a flowchart showing a second embodiment method performed, at least in part, by a second embodiment system.

FIG. 5 shows flowchart 500 depicting a method (also referred to as "method 500") according to the present invention for generating language models ("LM") for on-topic and off-topic questions. The method begins with a set of two training corpora—one labeled as on-topic and the other labeled as off-topic. Each corpus includes a set of documents corresponding to the respective corpus' label (on-topic or off-topic). Furthermore, each corpus is associated with a corresponding set of training questions (labeled as on-topic and off-topic, respectively).

Processing begins with step S505, where method 500 groups each training corpus (or "corpus") with its corresponding training question set (or "question set").

Processing proceeds to step S510, where each document in each corpus is split into topically related paragraphs (or "topical subsets"), where a "paragraph" is a relatively short (typically 1-4 sentences) set of sentences. These topically related paragraphs for each document are then merged into a single set of topically related paragraphs (or "paragraph set") for each corpus.

Processing proceeds to step S515, where the question set for each corpus is added to the corpus' corresponding paragraph set.

Processing proceeds to step S520, where method 500 annotates the paragraphs in each paragraph set using Named Entity Recognition ("NER"). Although the set of potential named entities is virtually boundless, some basic entity types include, but are not limited to, the following: places (such as "New York City"), people (such as "The President of the United States"), foods (such as "French fries"), and/or medicines.

Processing proceeds to step S525, where method 500 uses natural language processing ("NLP") to tokenize, lemmatize, and further annotate the paragraphs in the paragraph set. Stated another way, in this step, method 500 breaks each paragraph up into tokens (such as words, phrases, and/or symbols), standardize tokens (or "lemmatizes"), and then provides additional annotations for those tokens. Examples of additional annotations include, but are not limited to, the following: (i) lexical annotations, such as parts of speech; (ii) parse annotations showing dependencies between terms in a parse tree; (iii) type information (where, for example, "New York City" would get the type of: PLACE, CITY"; and/or (iv) relationship extraction annotators that provide connections between different pieces of text (for example, "Rowling wrote Harry Potter"->"Rowling" will have an annotation saying "authorOf('Harry Potter')"). Relationship extraction can also help identify negation and perform anaphora resolution.

Processing proceeds to step S530, where method 500 uses a stop word list to replace tokens that match the list with a pre-determined word (such as "STOP_WORD") that indicates that the token is, in fact, a stop word/token.

Processing proceeds to step S535, where method 500 splits each tokenized paragraph into trigrams, where each gram in each trigram contains a list of features for that gram (such as synonyms/lemma, type, focus, and/or lexical attribute type). In many embodiments, a gram is a chunk (where the chunk may be a single term or a group of terms determined by NER to be one entity). In these embodiments, the chunk is combined with its list of features to form the gram (which, as a result, resembles an array of information).

Processing proceeds to step S540, where method 500 provides a weighted count for each trigram, where the weighted count corresponds to the combined weight of each of the trigram's features. For example, in one embodiment, text features are given a weight of 1 and non-text features are given a weight of 0.5. It should be noted that in many embodiments, each trigram is created by combining all permutations of the features in each of the trigram's three grams (for example, [A,B] [C] [D]]->[A,C,D] and [B,C,D]).

Processing for method 500 completes after step S540. The results of method 500 include generated LMs for both on-topic questions and off-topic questions. In some embodiments, the steps of method 500 are repeated with additional corpora and training questions to create additional LMs, resulting in collections of on-topic LMs and off-topic LMs.

Still referring to the embodiment discussed in relation to FIG. 5 and method 500, when a new question is entered into the system, steps S520 through S535 are performed on the new question. The trigrams of the question are then used to calculate the question's probability for each of the LMs (in many embodiments, backoff and smoothing methods are used to assist in this calculation). Then, a classifier determines whether the question is on-topic or off-topic. In many embodiments, the classifier utilizes a k-Nearest Neighbors (or "KNN") algorithm to make this determination, where "closest" (as used in the KNN algorithm) is determined by the greatest probability and k is typically 1 (but can also be 3 or 5 when there are a large number of LMs being used).

In another embodiment of the present invention (which will be discussed in detail over the following paragraphs), an on-topic pipeline and an off-topic pipeline are used to determine whether a given question is on-topic and off-topic. In this embodiment, the on-topic pipeline includes the question answering process of a typical question answering system—that is, the result of processing a question through the on-topic pipeline is a set of answer(s) to the question with confidence value(s). The result of the on-topic pipeline is sent to an answerer, where it is compared to the result of the question being processed by the off-topic pipeline (to be discussed in further detail, below) to produce a final determination as to whether the question is on-topic or off-topic.

The off-topic pipeline includes a scoring metric that compares the question's text against two probabilistic language models—one trained from on-topic questions and one trained from off-topic questions (such as those generated by method 500). Each probabilistic language model returns the log probability of the question's text occurring within the context of the model's particular corpus. The difference between the two log probabilities results in a likelihood ratio value which, because the likelihood ratio value is unbounded, is normalized via a transform function. The value is then delivered to an answerer module, which further normalizes the value. The answerer uses a sigmoid transform function with constant parameters to control the amount of thresholding (or sensitivity) of the normalized confidence value. A smaller threshold value represents a lessened sensitivity towards the detection of off-topic questions by reducing the normalized confidence value, thereby minimizing false positive results.

Block diagram 600 (see FIG. 6) depicts portions of a QA system according to the present embodiment. As shown in diagram 600, a question enters the system and is processed asynchronously by off-topic pipeline 610 and on-topic pipeline 620 (the identification of the question's respective pipeline is retained in the question structure during processing). Off-topic pipeline 610 calculates a confidence value for the question, which is sent to answerer 630. Similarly, on-topic pipeline 620 calculates confidence values from all of the candidate answers to the question and correspondingly sends those confidence values to answerer 630. Answerer 630 contains logic to compare the confidence values from both pipelines 610, 620 and selects the answer from either pipeline containing the highest confidence— where the answer is either "off topic" or a candidate answer from on-topic pipeline 620.

Figure 6:
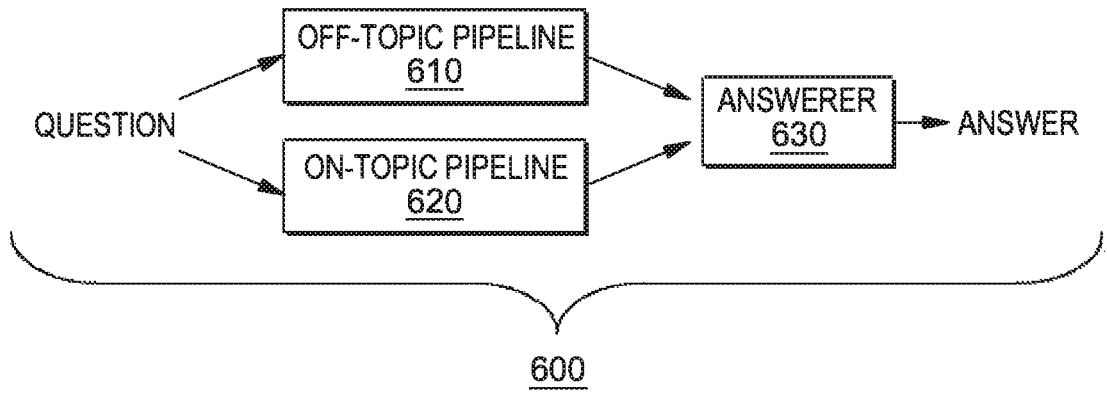
FIG. 6 is a block diagram showing a third embodiment system according to the present invention.
Figure 7:
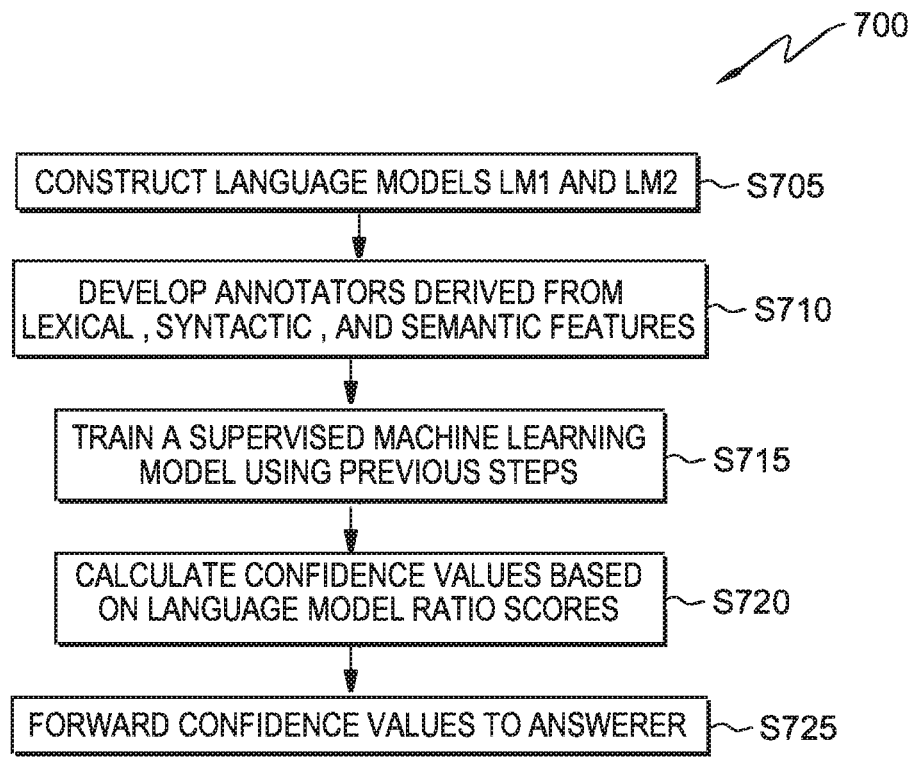
FIG. 7 is a flowchart showing a third embodiment method performed, at least in part, by the third embodiment system.

FIG. 7 shows flowchart 700 depicting a method (also referred to as "method 700") according to the present invention, where method 700 represents steps performed by off-topic pipeline 610 (see FIG. 6) in training language models and then using those models to calculate a confidence value for a given question. To assist in training the models, a set of training corpora is provided. The set of training corpora includes the following: (i) a set of "correct" on-topic questions, labeled "set 1A;" (ii) a set of "incorrect" on-topic questions, labeled "set 1B;" (iii) a set of "correct" off-topic questions, labeled "set 2A;" and (iv) a set of "incorrect" off-topic questions, labeled "set 2B."

Processing begins with step S705, where off-topic pipeline 610 constructs language models LM1 and LM2. Language model LM1—which represents on-topic questions— is constructed from set 1A, and language model LM2— which represents off-topic questions—is constructed from set 2A. Additionally, in many embodiments, LM1 includes multiple on-topic language models, and LM2 includes multiple off-topic language models.

Processing proceeds to step S710, where off-topic pipeline 610 develops annotators derived from lexical, syntactic, and semantic features to score the relevance of off-topic questions in set 1B and set 2B. More specifically, in some embodiments, off-topic pipeline 610 annotates the off-topic questions in sets 1B and 2B to indicate items such as named entities, semantic roles, and/or entity relationships, for example.

Processing proceeds to step S715, where off-topic pipeline 610 trains a supervised machine learning model using questions from sets 1B and 2B and scores from step S710. This model is used to further enhance the QA system used by on-topic pipeline 720.

Processing proceeds to step S720, where off-topic pipeline 610 calculates a confidence value based on language model ratio scores for both LM1 and LM2 for a given input question. In many embodiments, the calculation involves subtracting the log of LM1 from the log of LM2, using the incoming question as input. The result is bound to a (0, 1) confidence interval using a sigmoid function, where several coefficients are supplied as parameters to the sigmoid function to provide thresholding functionality. Diagram 800 (see FIG. 8) includes a representation of this subtraction and the corresponding sigmoid function. Specifically, continuum 810 represents the initial bounds of the sigmoid function (−∞,∞), graph 820 depicts a graphical representation of the sigmoid function, and continuum 830 represents values of the sigmoid function when bound to the (0,1) confidence interval. The location where the sigmoid function crosses the vertical axis in graph 820 is the confidence value.

Processing proceeds to step S725 (see FIG. 7), where the confidence value is forwarded to answerer 630 (see FIG. 6). Answerer 630 receives the confidence value and determines, based on the interval the confidence value falls in, whether the question is on-topic or off-topic. Referring to continuum 830, in some embodiments, if the confidence value is located in the (0,0.5) interval, then the question is considered on-topic. If the confidence value is in the (0.5, 1) interval, the question is considered off-topic.

Figure 8:
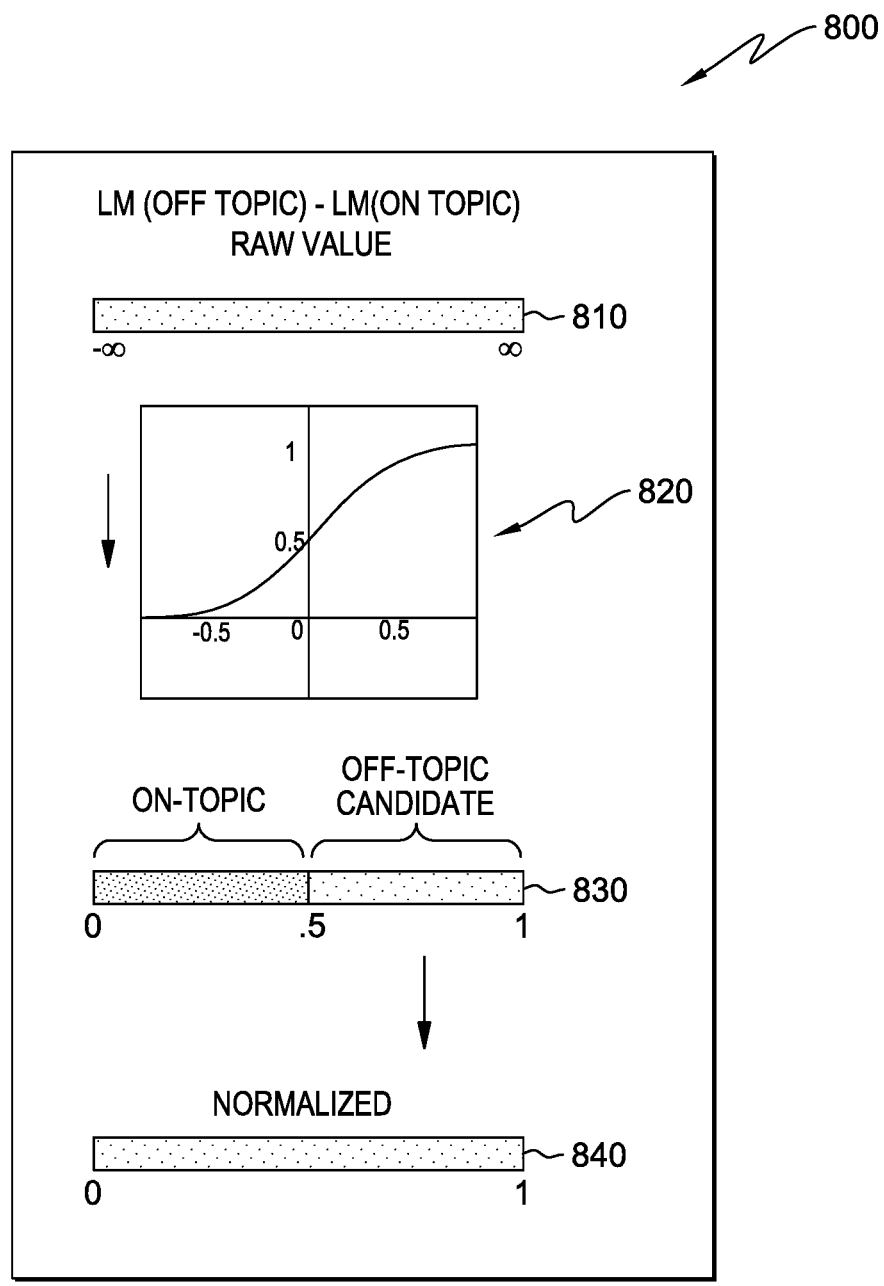
FIG. 8 is a diagram depicting information that is helpful in understanding on/off-topic confidence values according to the present invention.

In many embodiments, the confidence value is normalized prior to being compared to any confidence values received from on-topic pipeline 620. Continuum 840 (see FIG. 8) depicts an example of this normalization. As shown in FIG. 8, if the confidence value is within the (0,0.5) interval, then the confidence value is normalized to zero; alternatively, if the confidence value is within the (0.5,1) interval, the confidence value is uniformly normalized to 1. It should be noted that this is just one simplified example of normalization and that other known (or yet to be known) normalization methods may be used in other embodiments.

At answerer 630, the confidence value received from off-topic pipeline 610 are compared to confidence values from candidate answers produced by on-topic pipeline 620. The (typically normalized) confidence value from off-topic pipeline 610 is compared to the top-rated confidence value from on-topic pipeline 620, and the highest between the two is chosen as the preferred response.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, by a question answering system adapted to answer questions for a particular domain, an input question;
   determining: (i) a first logarithm probability associated with the input question under an on-topic probabilistic language model for the particular domain, and (ii) a second logarithm probability associated with the input question under an off-topic probabilistic language model for the particular domain;
   modelling, using a sigmoid function, a difference between the first logarithm probability and the second logarithm probability;
   assigning, based, at least in part, on the modelled difference, a topic score to the input question; and
   determining, based, at least in part, on the assigned topic score, whether the input question is off-topic with respect to the particular domain.

2. The method of claim 1, wherein the determining of whether the input question is off-topic with respect to the particular domain includes comparing the assigned topic score to a relevance score associated with an answer generated by the question answering system in response to the input question.

3. The method of claim 2, further comprising determining the input question is off-topic based, at least in part, on the assigned topic score being greater than the associated relevance score for the generated answer.

4. The method of claim 2, further comprising determining the input question is on-topic based, at least in part, on the assigned topic score being less than the associated relevance score for the generated answer.

5. The method of claim 1, further comprising:
   responsive to determining that the input question is off-topic, informing a user who input the input question into the question answering system that the input question is off-topic.

6. The method of claim 1, wherein the on-topic probabilistic language model is trained using questions that have been identified as being on-topic with respect to the particular domain, and wherein the off-topic probabilistic language model is trained using questions that have been identified as being off-topic with respect to the particular domain.

7. A computer program product comprising a computer readable storage medium having stored thereon:
   program instructions to receive, by a question answering system adapted to answer questions for a particular domain, an input question;
   program instructions to determine: (i) a first logarithm probability associated with the input question under an on-topic probabilistic language model for the particular domain, and (ii) a second logarithm probability associated with the input question under an off-topic probabilistic language model for the particular domain;
   program instructions to model, using a sigmoid function, a difference between the first logarithm probability and the second logarithm probability;

program instructions to assign, based, at least in part, on the modelled difference, a topic score to the input question; and program instructions to determine, based, at least in part, on the assigned topic score, whether the input question is off-topic with respect to the particular domain.

8. The computer program product of claim 7, wherein determining whether the input question is off-topic with respect to the particular domain includes comparing the assigned topic score to a relevance score associated with an answer generated by the question answering system in response to the input question.

9. The computer program product of claim 8, the computer readable storage medium having further stored thereon program instructions to determine the input question is off-topic based, at least in part, on the assigned topic score being greater than the associated relevance score for the generated answer.

10. The computer program product of claim 8, the computer readable storage medium having further stored thereon program instructions to determine the input question is on-topic based, at least in part, on the assigned topic score being less than the associated relevance score for the generated answer.

11. The computer program product of claim 7, the computer readable storage medium having further stored thereon program instructions to, responsive to determining that the input question is off-topic, inform a user who input the input question into the question answering system that the input question is off-topic.

12. The computer program product of claim 7, wherein the on-topic probabilistic language model is trained using questions that have been identified as being on-topic with respect to the particular domain, and wherein the off-topic probabilistic language model is trained using questions that have been identified as being off-topic with respect to the particular domain.

13. A computer system comprising:
a processor(s) set; and
a computer readable storage medium;
wherein:
the processor set is structured, located, connected and/or programmed to run program instructions stored on the computer readable storage medium; and
the stored program instructions include:
program instructions to receive, by a question answering system adapted to answer questions for a particular domain, an input question;

program instructions to determine: (i) a first logarithm probability associated with the input question under an on-topic probabilistic language model for the particular domain, and (ii) a second logarithm probability associated with the input question under an off-topic probabilistic language model for the particular domain;

program instructions to model, using a sigmoid function, a difference between the first logarithm probability and the second logarithm probability;

program instructions to assign, based, at least in part, on the modelled difference, a topic score to the input question; and program instructions to determine, based, at least in part, on the assigned topic score, whether the input question is off-topic with respect to the particular domain.

14. The computer system of claim 13, wherein determining whether the input question is off-topic with respect to the particular domain includes comparing the assigned topic score to a relevance score associated with an answer generated by the question answering system in response to the input question.

15. The computer system of claim 14, the stored program instructions further including program instructions to determine the input question is off-topic based, at least in part, on the assigned topic score being greater than the associated relevance score for the generated answer.

16. The computer system of claim 14, the stored program instructions further including program instructions to determine the input question is on-topic based, at least in part, on the assigned topic score being less than the associated relevance score for the generated answer.

17. The computer system of claim 13, the stored program instructions further including program instructions to, responsive to determining that the input question is off-topic, inform a user who input the input question into the question answering system that the input question is off-topic.

18. The computer system of claim 13, wherein the on-topic probabilistic language model is trained using questions that have been identified as being on-topic with respect to the particular domain, and wherein the off-topic probabilistic language model is trained using questions that have been identified as being off-topic with respect to the particular domain.

* * * * *